United States Patent [19]
Pasbrig

[11] 4,026,581
[45] May 31, 1977

[54] RELEASABLE COUPLING

[75] Inventor: Max Pasbrig, Orselina, Switzerland

[73] Assignee: Lacrex Brevetti S.A., Minusio, Switzerland

[22] Filed: Nov. 13, 1975

[21] Appl. No.: 631,665

[52] U.S. Cl. .............................. 285/24; 285/316; 285/319; 285/331

[51] Int. Cl.² .................................... F16L 37/12

[58] Field of Search .......... 285/331, 316, 319, 317, 285/27, 24

[56] References Cited

UNITED STATES PATENTS

| | | | |
|---|---|---|---|
| 1,815,660 | 7/1931 | Walker | 285/317 X |
| 2,727,759 | 12/1955 | Elliott | 285/316 X |
| 2,877,437 | 3/1959 | Flanagan | 285/316 X |
| 3,476,412 | 11/1969 | Demler | 285/331 X |
| 3,709,528 | 1/1973 | Cruse | 285/316 |
| 3,768,476 | 10/1973 | Raitto | 285/331 X |

FOREIGN PATENTS OR APPLICATIONS

| | | | |
|---|---|---|---|
| 1,455,850 | 9/1966 | France | 285/316 |

*Primary Examiner*—Thomas F. Callaghan
*Attorney, Agent, or Firm*—Werner W. Kleeman

[57] ABSTRACT

A releasable coupling for connecting hoses, pipes, rods or the like. The coupling has a male member and a female member, the female member being provided with an additional guide pipe or sleeve for centering the male member as it is inserted into the female member, to protect a sealing ring of the coupling from damage during the inserting, and also to reinforce the coupled assembly.

3 Claims, 4 Drawing Figures

RELEASABLE COUPLING

The present invention relates to a releasable coupling device for coupling rods, pipes, hoses or the like, comprising a male member with an insert extension having peripheral surface in which is provided a locking recess of the type of a peripheral groove; a retaining sleeve disposed over said male member and behind said peripheral groove as viewed from the front edge of said insert extension, said retaining sleeve being slidable against a spring pressure, said retaining sleeve including a sleeve jacket disposed at a predetermined spacing from said peripheral surface of said extension, said sleeve jacket being disposed over said peripheral groove when the jacket is in a locked position; and a female member forming a socket bush for receiving the insert extension of the male member, wherein clamping fingers are provided in said female member, said clamping fingers having clamping bosses adapted to engage the peripheral groove of said insert extension.

In a coupling device of this type, the insert extension projects into the female member to form with its inside surface a wall of a passage channel. The front edge of the said insert extension does not always provide for a sealed connection. A required sealing ring can only be applied inside the female member. Thus, the sealing ring often has to be located too close to the unsealed point of contact between the insert extension and the female member. Such a sealing is often sufficient especially for higher pressure, mainly due to the fact that the sealing ring is frequently subjected to a strong and nonuniform load at a noncentered insertion of the insert extension of the male member.

It is therefore an object of the present invention to provide an improved coupling device which would avoid the above mentioned drawbacks and would, at the same time, provide for a centered insertion of the above members into one another, and which would also provide for a sealing capable to withstand a higher pressure.

According to the invention, the above object is achieved by a coupling device of the above mentioned type, wherein a guide pipe is provided which is spaced from the inside of said female member by a distance substantially corresponding to the wall thickness of said insert extension so that the guide pipe is adapted to surround the inside surface of the insert extension of said male member.

Suitably, the guide pipe extends with its free end at least as far as the free ends of the clamping fingers in order to facilitate the introduction of the insert extension.

A distortion free, smooth side wall is obtained, when the guide pipe is arranged to form aligned abutment joint with the inside surface of the insert extension.

The guide pipe makes the coupling device particularly suitable for coupling elements which have to be secured against undesired disengagement.

The drawing shows one embodiment of a clamping or coupling device according to the present invention. In the drawing.

Figure 1:
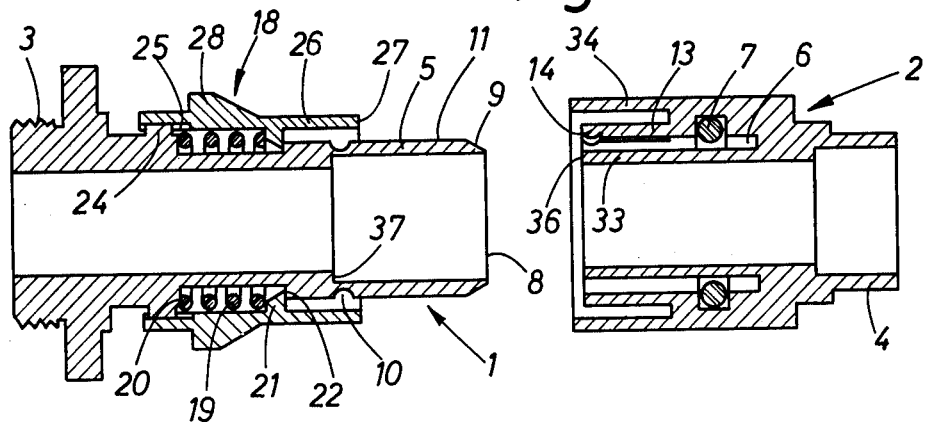
FIG. 1 is a section of both members shown in a disengaged position.

The coupling device consists of a male member 1 and a female member 2. Both members are provided at their ends opposite to the coupling terminations with a thread 3, 4, for securing the coupling members to rods, pipes, hoses or the like. In the embodiments shown in the drawing, the two members are tubular coupling members for a fluid conduit. The members can also have a cross section different from that shown in the drawings.

The male member 1 forms an insert extension 5 which is adapted to be inserted in a receiving bush 6 of the female member 2. Disposed in the receiving bush is an O-ring 7 for sealing engagement with the insert extension 5. A bevelled surface 9 at the front edge 8 of the extension facilitates the sliding of same through the sealing ring 7. Arranged at a predetermined distance from the front edge 8 is a peripheral groove 10 which is formed in the peripheral surface 11 of the insert extension 5. Extending backwards on the female member as viewed from the receiving end of same is at least one, preferably three clamping fingers 13 the free front ends of which are each provided with an inwardly projecting clamping boss 14, the surface of which is produced to correspond to the shape of the peripheral groove 10 of the insert extension 5. The clamping fingers 13 are somewhat resilient so that they can yield radially outwardly when pressed. The spacing of the clamping bosses 14 from the sealing ring 7 is somewhat smaller than the above noted predetermined spacing, so that the insert extension 5 is surrounded by the sealing ring 7 (FIG. 3) whenever the clamping bosses 14 are in a locked position with respect to the peripheral groove. The peripheral surface 11 of the insert extension is cylindrical or straight and the groove always froms a recess.

Figure 3:
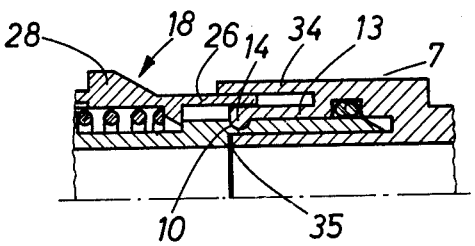
FIG. 3 is the same section as in FIG. 2, showing the elements in a locked position.
Figure 4:
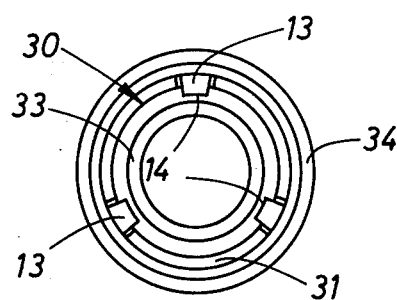
FIG. 4 is a front view of the female member as shown in FIG. 1.

A retaining sleeve 18 is provided on the male member 1. The sleeve 18 is arranged at a distance behind the groove 10 as viewed from the front end of the insert extension. A compression spring 19 which rests with its one end against a shoulder 20 of the male member, is arranged to press with its opposite end against a collar 21 of the retaining sleeve and thus maintains the retaining sleeve positioned at its outward or locking position. In this position, the collar 21 rests against a shoulder 22 of the male member, whereby the retaining sleeve is held in its forward position. Preferably, the retaining sleeve is further secured against rotary movement by longitudinal ribs 24 provided at the periphery of the male member, the ribs 24 being received in inner longitudinal grooves 25 of the retaining sleeve. The retaining sleeve is provided with a sleeve jacket 26 which is arranged to surround the peripheral groove 10 of the insert extension when the retaining sleeve is in locked position (FIG. 1 and FIG. 3). The front edge 27 of the sleeve jacket 26 is produced as a stop edge. The sleeve jacket is made from a rigid, non-resilient material. The sleeve jacket surrounds the insert extention 5 at a predetermined spacing. This spacing must be of the size corresponding at least to the thickness of the wall of the clamping fingers 13 so as to allow for passage of the fingers in the space. However, the spacing cannot be too large as it would then allow for release of the clamping bosses from the groove 10, when the sleeve jacket 26 covers the clamping fingers 13 in the locked or coupled position.

If three or more clamping fingers 13 are provided, they form, to a certain degree, guide means. The guiding of the extension 5 can be improved by arranging the clamping fingers 13 inside a guide ring 30, consisting of rigid segment members 31.

The female member comprises an additional inner guide pipe 33 as well as an outer protection jacket 34. The protection jacket 34 partially covers the clamping fingers and also the retaining sleeve 18 when the same is in coupled position. Preferably, the protection jacket 34 is knurled at its outer surface with knurling to provide for a good grip.

The inner guide pipe terminates approximately at the ends of the clamping finger bosses 14. It can also be longer or shorter. However, if it terminates inside of the bosses 14, then the introduction of the insert extension 5 is more difficult. The guide pipe is used in guiding of the insert extension. It prevents the insertion of the extension into the female member at an inclined or twisted position. The guide pipe also secures a uniform loading deformation of the sealing ring 7 during the inserting operation. The joint area 35 (FIG. 3) between the end 36 of the guide pipe and a shoulder 37 provided on the insert extension 5, is sufficiently remote from the sealing ring so that fluid which might eventually enter in this gap has to overcome a comparatively long path between the guide pipe and the insert extention 5 before it reaches the sealing ring 7. The tightness of this coupling device is thus substantially increased. The guide pipe also makes it possible to provide for a tighter joint 35 by exactly aligned and smooth inner walls which do not give rise to an increased resistance to the fluid flow inside. The guide pipe also prevents the breaking of the joint, which results in the possibility of producing the mutually engaged portions, such as the insert extention, clamping fingers etc., in a shorter version, thus reducing the overall length of the entire device as compared with coupling devices without the guide pipe.

Figure 2:
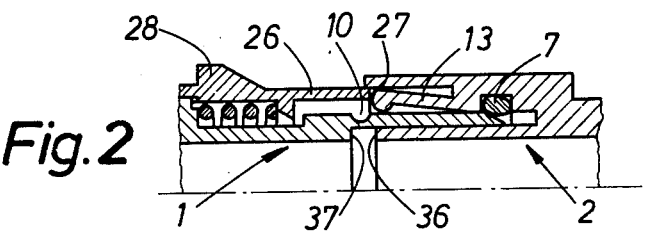
FIG. 2 shows a section of the same members but in an inserted position immediately before the locking.

The operation of the device is as follows:

When the two members 1 and 2 are inserted into one another, the insert extension 5 strikes with its bevelled surface 9 against the clamping bosses 14 which thus spread outwardly, as shown in FIG. 2. Finally, the bevelled surface 9 passes beyond the sealing ring 7. The spread clamping fingers 13 then reach the front edge 27 of the sleeve jacket 26 which is thus forced to slide back together with the retaining sleeve 18, against the action of the compression spring 19, so that the clamping bosses 14 can enter the peripheral groove 10, whereupon the retaining sleeve 18 is forced by the spring 19 to move forwards into a position wherein the sleeve jacket surrounds the arrested clamping fingers 13 thus securing same in the coupled position. This locked state cannot be released even by a comparatively strong pull effected on the coupling members.

When disengaging the two coupling members, the retaining sleeve 18 is gripped with one hand, preferably over a knurled surface 28, and pushed back against the force of the spring 19, until the coverage of the clamping fingers 18 is removed. Subsequent pull on both or one of the coupling members results in the clamping bosses 14 escaping from the circumferential groove and the two coupling members can thus be separated from one another.

The coupling portions are preferably produced from a suitable plastic material. In such embodiment, both the male and the female member can be each produced as a single-piece unit without considerable difficulties, which provides for numerous advantages. The female member has only to be provided with the O-ring 7. The retaining sleeve 18, which can also be produced as a single-piece unit, is then pushed from the front end over the insert extension 5 following an appropriate positioning of the spring 19. The inside collar 21 is preferably formed in such a way that it yields upon the above loading and then returns back into its unreleasable position, whereby it defines the hollow in which the spring 19 is located.

The coupling device with a pipe guide according to the present invention can also be applied in the art of shaft couplings or plug couplings for rotating parts. In such a case, the peripheral groove is preferably produced in an interrupted fashion to provide segments each of which extends only over a small portions of the periphery, the length of the groove portions being adapted to correspond to the width of the clamping bosses, so that the clamping bosses are stopped in both directions of rotation thus providing for a connection wherein the two coupling members are prevented from turning of one with respect to the other.

The embodiments of the present invention in which an exclusive property or privilege is claimed are defined as follows:

1. Releasable coupling device comprising cooperating male and female members for sealingly containing fluids therein, a male member with an insert extension having a peripheral surface including a peripheral groove for releasably engaging clamping fingers; a retaining sleeve axially displaceable upon said male member and behind said peripheral groove as viewed from the front edge of said insert extension, said retaining sleeve being slidable against a spring pressure, said retaining sleeve including a sleeve jacket disposed at a predetermined spacing from said peripheral surface of said insert extension, said sleeve jacket covering said peripheral groove when the jacket is in a locked position; and a female member forming a socket bush for receiving the insert extension of the male member, said female member including radially resilient clamping fingers longitudinally extending from the inside surface thereof, said clamping fingers having clamping bosses adapted to engage the peripheral groove of said insert extension, a guide pipe spaced from the inside of said female member clamping fingers by the thickness of wall of said insert extension, said guide pipe extends with its free end at least as far as the bosses of the clamping fingers, said guide pipe outside surface engages and surrounds the inside surface of the insert extension of said male member when the male member is in a connected relationship with the female member to form an elongated tortuous path for sealing purposes, a sealing ring positioned rearwardly from said clamping bosses for sealing the terminal external end portion of said male member insert extension, said sealing ring being positioned at the end of said tortuous path whereby internal fluid seeking to escape must enter the transverse passageway between the male and female members, traverse the longitudinally extending, engaging surfaces defined by the guide pipe and the insert and reverse direction before contacting the sealing ring, and whereby said guide pipe centers said insert extension as it is inserted into said female member, protects said sealing ring from damage during the insertion, and reinforces the coupling device.

2. Clamping device according to claim 1, characterized in that the insert extension of the male member is provided with a shoulder which forms an aligned abutment joint with the end of the guide pipe when said members are connected with one another.

3. Coupling device according to claim 1 characterized in that the peripheral groove is confined to peripheral segments to provide side limitation for the clamping bosses.

* * * * *